(12) United States Patent
He et al.

(10) Patent No.: US 10,994,866 B1
(45) Date of Patent: May 4, 2021

(54) FLIGHT TEST SYSTEM FOR FLAPPING-WING AERIAL VEHICLE

(71) Applicant: University of Science and Technology Beijing, Beijing (CN)

(72) Inventors: Wei He, Beijing (CN); Xinxing Mu, Beijing (CN); Shufen Tian, Beijing (CN); Qiang Fu, Beijing (CN); Yao Zou, Beijing (CN); Haifeng Huang, Beijing (CN); Xiuyu He, Beijing (CN)

(73) Assignee: UNIVERSITY OF SCIENCE AND TECHNOLOGY BEIJING, Beijing (CN)

( * ) Notice: Subject to any disclaimer, the term of this patent is extended or adjusted under 35 U.S.C. 154(b) by 0 days.

(21) Appl. No.: 17/118,637

(22) Filed: Dec. 11, 2020

(30) Foreign Application Priority Data

Mar. 9, 2020 (CN) .......................... 202010157069.0

(51) Int. Cl.
*G01M 9/02* (2006.01)
*G01M 9/08* (2006.01)
(Continued)

(52) U.S. Cl.
CPC ................ *B64F 5/60* (2017.01); *B64C 33/00* (2013.01); *G01M 9/02* (2013.01); *G01M 9/062* (2013.01); *G01M 9/065* (2013.01); *G01M 9/08* (2013.01)

(58) Field of Classification Search
CPC .......... G01M 9/04; G01M 9/062; G01M 9/02; G01M 9/08; G01M 9/065; G01M 17/0074;
(Continued)

(56) References Cited

U.S. PATENT DOCUMENTS

2016/0238481 A1* 8/2016 Brandon ................. G01M 9/08
2016/0376003 A1* 12/2016 Feldman ................. B64C 13/44
703/2

FOREIGN PATENT DOCUMENTS

| CA | 2677284 A1 * | 10/2008 | ............... G01K 7/42 |
| EP | 2778049 A1 * | 9/2014 | ................ B64F 5/60 |
| WO | WO-2008118547 A2 * | 10/2008 | ........... B64C 27/006 |

OTHER PUBLICATIONS

Wenbo Duan, et al., Design and Wind Tunnel Test of an Active Morphing Wing Ornithopter, Journal of Aeronauties, 2013, pp. 474-486, vol. 34, No. 3.

* cited by examiner

*Primary Examiner* — Andre J Allen
(74) *Attorney, Agent, or Firm* — Bayramoglu Law Offices LLC

(57) ABSTRACT

A flight test system for a flapping-wing aerial vehicle includes a host computer platform, a measurement mechanism, and a wind tunnel. The measurement mechanism is configured to mount a to-be-tested flapping-wing aerial vehicle prototype. The measurement mechanism includes an Euler angle controller, a flow angle controller, and a tripod. The flow angle controller is mounted on the tripod. The Euler angle controller is in transmission connection with the flow angle controller. The flapping-wing aerial vehicle prototype is detachably connected to the Euler angle controller by using a first connecting member. The host computer platform is in communication connection with the measurement mechanism and the wind tunnel, and is configured to control a wind speed of the wind tunnel and display a flight status of the flapping-wing aerial vehicle prototype in real time during test.

9 Claims, 5 Drawing Sheets

(51) Int. Cl.
 *B64F 5/60* (2017.01)
 *B64C 33/00* (2006.01)
 *G01M 9/06* (2006.01)
(58) Field of Classification Search
 CPC .... G01M 9/06; G01M 17/007; G01M 5/0066;
 G01M 7/02; G01M 9/067; G01M 17/00;
 G01M 5/0008; G01M 5/0016; G01M
 5/0041; G01M 7/06; G01M 13/00; G01M
 15/14; G01M 17/0072; G01M 17/0076;
 G01M 17/045; G01M 7/00; G01M
 99/002; G01M 10/00; G01M 17/02;
 G01M 17/04; G01M 1/127; G01M
 99/008; G01P 13/025; G01P 5/165; G01P
 5/14; G01P 5/16; G01P 13/02; G01P
 5/00; G01P 5/02; G01P 21/025; G01P
 5/12; G01P 5/26; G01P 5/005; G01P
 5/175; G01P 5/18; G01P 5/24; G01P
 13/045; G01P 15/036; G01P 1/02; G01P
 21/00; G01P 3/62; G01P 5/07; G01P
 5/08; G01P 5/245; B64D 43/02; B64D
 15/20; B64D 43/00; B64D 15/12; B64D
 1/18; B64D 2033/0286; B64D 33/02;
 B64D 33/08; B64D 45/00; B64C 23/00;
 B64C 23/005; B64C 2230/02; B64C 3/48
 USPC .............................................. 73/147, 170.02
 See application file for complete search history.

FLIGHT TEST SYSTEM FOR FLAPPING-WING AERIAL VEHICLE

CROSS REFERENCE TO THE RELATED APPLICATIONS

This application is based upon and claims priority to Chinese Patent Application No. 202010157069.0, filed on Mar. 9, 2020, the entire contents of which are incorporated herein by reference.

TECHNICAL FIELD

The present invention relates to the field of flapping-wing aerial vehicle technologies, and in particular, to a flight test system for a flapping-wing aerial vehicle.

BACKGROUND

A flapping-wing aerial vehicle is a new type of aircraft that imitates the flight of birds, and can obtain the lift and forward thrust required for flight through the flapping motion of wings. The flapping-wing aerial vehicle has a wide range of applications in both military and civilian fields, such as low-altitude reconnaissance, urban warfare, and environmental monitoring. With the advantages of concealment and low energy consumption, the flapping-wing aerial vehicle has great development potentials in the military and civilian fields.

However, there are still many problems in the current research on the aerodynamic mechanism of the flapping-wing motion of the flapping-wing aerial vehicle. Compared with fixed-wing and rotary-wing aerial vehicles, the flapping-wing aerial vehicle generates aerodynamic forces in different manners that cannot be measured in the same way as conventional aerial vehicles.

In the prior art, the flapping-wing aerial vehicle is often regarded as a whole in the aerodynamic analysis. In addition, there is a lack of test methods for a flapping-wing aerial vehicle with multiple degrees of freedom and a multi-body structure, making it difficult to measure mechanical characteristics of an airframe in flight. Till now, there is no effective flight test system for flapping-wing aerial vehicles on the market, and prototype tests mainly rely on actual flight, which are greatly affected by environmental disturbances, resulting in high test costs and high damage rates.

SUMMARY

The present invention aims to provide a flight test system for flapping-wing aerial vehicles, to resolve a problem that there are no effective flight test systems for flapping-wing aerial vehicles on the market, and prototype tests mainly rely on flight tests, which are greatly affected by environmental disturbance, resulting in high test costs and high damage rates.

To solve the above problem, the present invention provides the following technical solutions.

A flight test system for a flapping-wing aerial vehicle includes a host computer platform, a measurement mechanism, and a wind tunnel, where the measurement mechanism is configured to mount a to-be-tested flapping-wing aerial vehicle prototype. After the flapping-wing aerial vehicle prototype is mounted to the measurement mechanism, both the flapping-wing aerial vehicle prototype and the measurement mechanism are placed in the wind tunnel during test;

the measurement mechanism includes an Euler angle controller, a flow angle controller, and a tripod, where the flow angle controller is mounted on the tripod, the Euler angle controller is in transmission connection with the flow angle controller, the flapping-wing aerial vehicle prototype is detachably connected to the Euler angle controller by using a first connecting member, the Euler angle controller is configured to control Euler angles of the flapping-wing aerial vehicle prototype during test, and the flow angle controller is configured to control a flow angle of the flapping-wing aerial vehicle prototype during test; and the host computer platform is in communication with the measurement mechanism and the wind tunnel, and is configured to control a wind speed of the wind tunnel and display a flight status of the flapping-wing aerial vehicle prototype in real time during test.

Further, the Euler angle controller includes a pitch control motor, a yaw control motor, and a roll control motor;

the pitch control motor is fixed to a second connecting member, the first connecting member is connected to an output shaft of the pitch control motor, a housing of the flapping-wing aerial vehicle prototype is mounted on the first connecting member, a center of mass of the flapping-wing aerial vehicle prototype is located directly above the first connecting member, and a pitch of the flapping-wing aerial vehicle prototype is controlled by controlling a rotation angle of the pitch control motor;

the yaw control motor is fixed to a third connecting member, the second connecting member is connected to an output shaft of the yaw control motor, and a yaw of the flapping-wing aerial vehicle prototype is controlled by controlling a rotation angle of the yaw control motor; and the yaw control motor is connected to an output shaft of the roll control motor by using a first connecting rod, the roll control motor is connected to the flow angle controller by using a second connecting rod, and a roll of the flapping-wing aerial vehicle prototype is controlled by controlling a rotation angle of the roll control motor.

Further, the measurement mechanism includes a multidimensional force sensor that is fixedly connected to the first connecting rod, and the yaw control motor is fixed to the multidimensional force sensor by using the third connecting member.

Further, the first connecting rod includes a straight rod portion and a circular arc portion, where one end of the straight rod portion is provided with a fixed sleeve, the multidimensional force sensor is fixed within the fixed sleeve, one end of the circular arc portion is connected to the output shaft of the roll control motor, and an arc radius of the circular arc portion is greater than a maximum distance from the center of mass of the flapping-wing aerial vehicle prototype to an end of a tail of the flapping-wing aerial vehicle prototype.

Further, the flow angle controller includes an angle-of-attack control servo and a sideslip angle control motor;

the angle-of-attack control servo is fixed to a rotary turntable, an output gear of the angle-of-attack control servo is connected to a first U-shaped servo arm, the first U-shaped servo arm is connected to a second U-shaped servo arm, the second U-shaped servo arm is connected to a fourth connecting member, the second connecting rod is inserted into the fourth connecting member, and an angle of attack of the flapping-wing aerial vehicle prototype is controlled by controlling a rotation angle of the angle-of-attack control servo; and the sideslip angle control motor is fixed to a fifth connecting member, an output shaft of the sideslip angle control motor is fixedly connected to a primary gear of a gear reduction unit, a secondary gear of the gear reduction unit is fixedly connected to the rotary turntable, the rotary turntable, the gear reduction unit, and the fifth connecting member are fixed to the tripod by using a fixing shaft, and a sideslip angle of the flapping-wing aerial vehicle prototype is controlled by controlling a rotation angle of the sideslip angle control motor.

Further, one end of the second connecting rod inserted into the fourth connecting member is provided with a through hole, and the second connecting rod is fixed to the fourth connecting member by using a fixing bolt through the through hole.

Further, the host computer platform includes a dynamic simulation module, a data decoding module, a wind speed adjustment module, a data processing module, and a display module, where the dynamic simulation module is configured to calculate flight data of the flapping-wing aerial vehicle prototype in a next moment according to a mathematical model and a remote controller control signal that correspond to the flapping-wing aerial vehicle prototype, send the flight data to the data processing module, the display module, and the measurement mechanism, control three-dimensional movement of a virtual simulation object of the flapping-wing aerial vehicle prototype, and demonstrate the three-dimensional movement on the display module, where the flight data includes attitude information, position information, and speed information;

the data decoding module is configured to receive triaxial aerodynamic force data and aerodynamic moment data of the flapping-wing aerial vehicle prototype that are acquired by the multidimensional force sensor, or is configured to receive attitude information and position information of the flapping-wing aerial vehicle prototype, decode the received data, and send the decoded data to the display module;

the wind speed adjustment module is configured to send a calculated wind speed to the wind tunnel, so that the wind speed of the wind tunnel remains consistent with a flight speed in analog simulation;

the data processing module is configured to further calculate the flow angle of the flapping-wing aerial vehicle prototype according to the attitude information and the position information that are obtained by the computed dynamic simulation module; and the display module is configured to display an attitude and a position in a simulated flight and dynamic data acquired by the multidimensional force sensor.

Further, the first connecting rod and the second connecting rod are made of hollow aluminum alloy materials.

Further, the pitch control motor, the yaw control motor, the roll control motor, and the sideslip angle control motor are step motors or servo motors.

Further, the measurement mechanism communicates with the host computer platform in a wireless communication manner.

The technical solutions of the present invention have the following beneficial effects:

The present invention provides a simulated flight test environment for a flapping-wing aerial vehicle to obtain dynamic characteristic data of the flapping-wing aerial vehicle in flight, which can replace a flight test to some extent, improve test efficiency, and reduce a prototype damage rate. A host computer platform provides an intuitive three-dimensional presentation for an attitude reconstruction process of the flapping-wing aerial vehicle. A user can verify a mathematical mode with reference to a flapping-wing aerial vehicle prototype, a wind tunnel, and a measurement mechanism. In addition to the mathematical model of the flapping-wing aerial vehicle described in the present invention, the user can also import a self-built mathematical model into the host computer platform for verification and testing. In addition, the user can further load a designed flight control algorithm onto a simulation model, to verify effectiveness of the algorithm.

In addition, the flight test system of the present invention is not limited to being applicable to the flapping-wing aerial vehicle of the present invention, but is further applicable to flapping-wing aerial vehicles of other configurations and even other types of flight vehicles, and can provide a general and effective simulation experiment and verification solution for different types and different structures of flight vehicles.

REFERENCE NUMERALS

Figure 1:
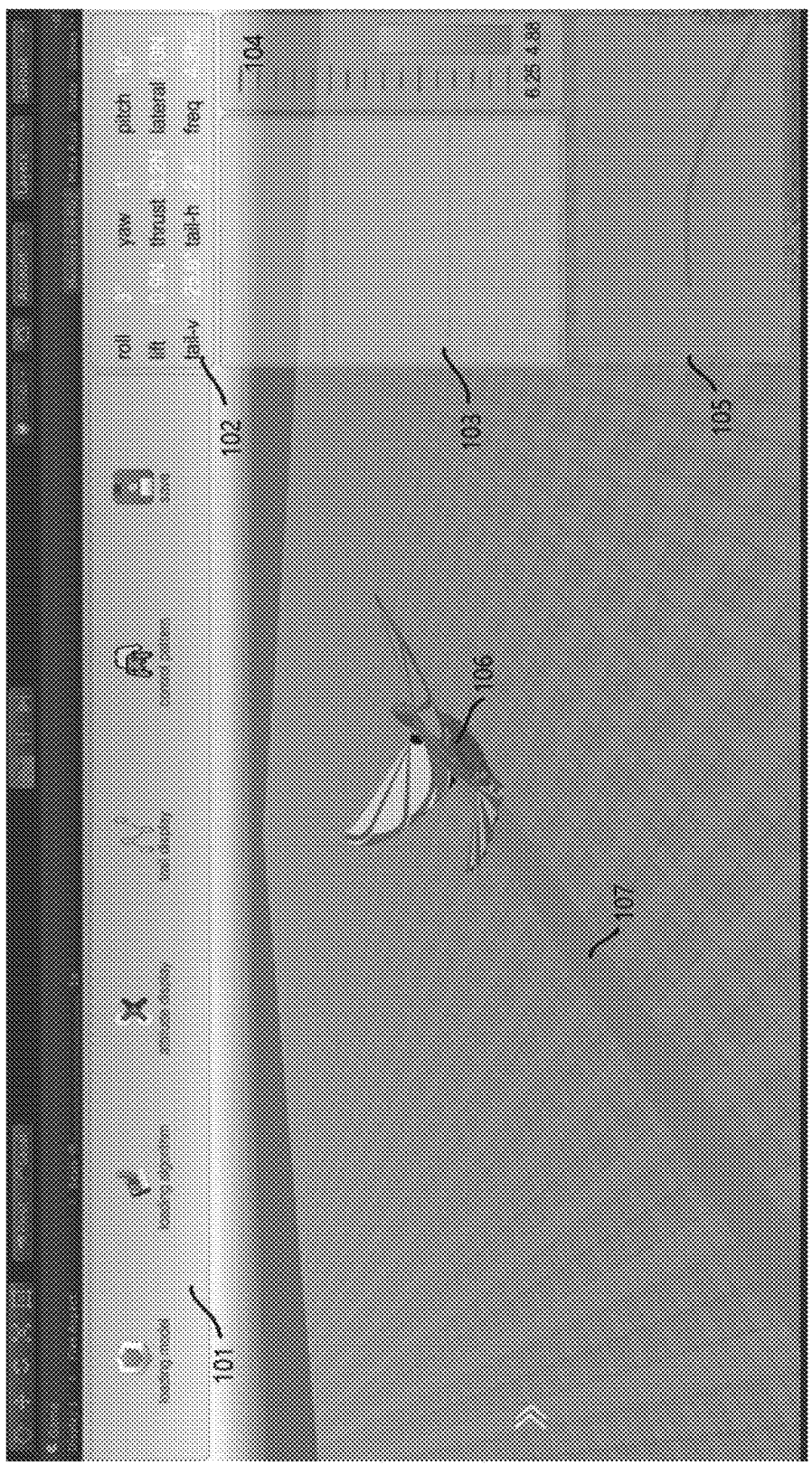
FIG. 1 is a schematic layout diagram of a display interface of a host computer platform according to an embodiment of this application.

101. function navigation bar; 102. data navigation bar; 103. curve navigation bar;

104. instrument navigation bar; 105. track navigation bar; 106. flapping-wing aerial vehicle; 107. tail track;

1. flapping-wing aerial vehicle prototype; 1A. housing; 1B. wing; 1C. tail;

2. first connecting member; 3. pitch control motor; 4. second connecting member;

5. yaw control motor; 6. third connecting member; 7. multidimensional force sensor; 8. first connecting rod;

8A. first fixed sleeve; 8B. straight rod portion; 8C. circular arc portion; 8D. connection end;

9. roll control motor; 10. second connecting rod; 10A. second fixed sleeve;

10B. second through hole; 11. fourth connecting member; 11A. first through hole; 11B. threaded hole;

12. fixing bolt; 13A. second U-shaped servo arm; 13B. first U-shaped servo arm;

14. angle-of-attack control servo; 15. rotary turntable; 16. gear reduction unit; 17. fifth connecting member;

18. sideslip angle control motor; 18A. sideslip angle control motor output shaft; and 19. tripod.

DETAILED DESCRIPTION OF THE EMBODIMENT

To make the technical problems be resolved by the present invention, technical solutions, and advantages clearer, detailed descriptions are provided below with reference to the accompanying drawings and specific embodiments.

Referring to FIG. 1 to FIG. 5, this embodiment provides a flight test system for a flapping-wing aerial vehicle, so as to simulate a flight status of the flapping-wing aerial vehicle, and help measure dynamic characteristics during flight. The flight test system is applicable to the field of flapping-wing aerial vehicle technologies. On one hand, a flapping-wing aerial vehicle prototype may be mounted on a measurement mechanism to acquire aerodynamic characteristics of the flapping-wing aerial vehicle in a simulated flight state in a wind tunnel environment in combination with an ATI six-dimensional force sensor. On the other hand, in an outdoor flight test of the flapping-wing aerial vehicle, attitude information and position information may be transmitted back to a host computer through wireless communication for output and display, and compared with data obtained through simulation calculation by a given mathematical model, thereby verifying model operation effectiveness.

Specifically, the flight test system of this embodiment includes two parts: a software platform and a hardware platform.

The hardware platform of this embodiment includes a measurement mechanism and a wind tunnel. The measurement mechanism is configured to mount a to-be-tested flapping-wing aerial vehicle prototype 1. During test, after the flapping-wing aerial vehicle prototype 1 is mounted to the measurement mechanism, both the measurement mechanism and the flapping-wing aerial vehicle prototype 1 are placed in the wind tunnel.

The flapping-wing aerial vehicle prototype 1 used in this embodiment has three degrees of freedom, respectively controlled by a remote controller by sending control signals. Control signals f, $\theta_t$, and $\phi_t$, respectively control a flapping frequency of wings 1B, a flapping angle of a tail 1C, and a roll of the tail 1C of the flapping-wing aerial vehicle prototype 1. A left-hand system is used to determine a positive direction of rotation.

Figure 3:
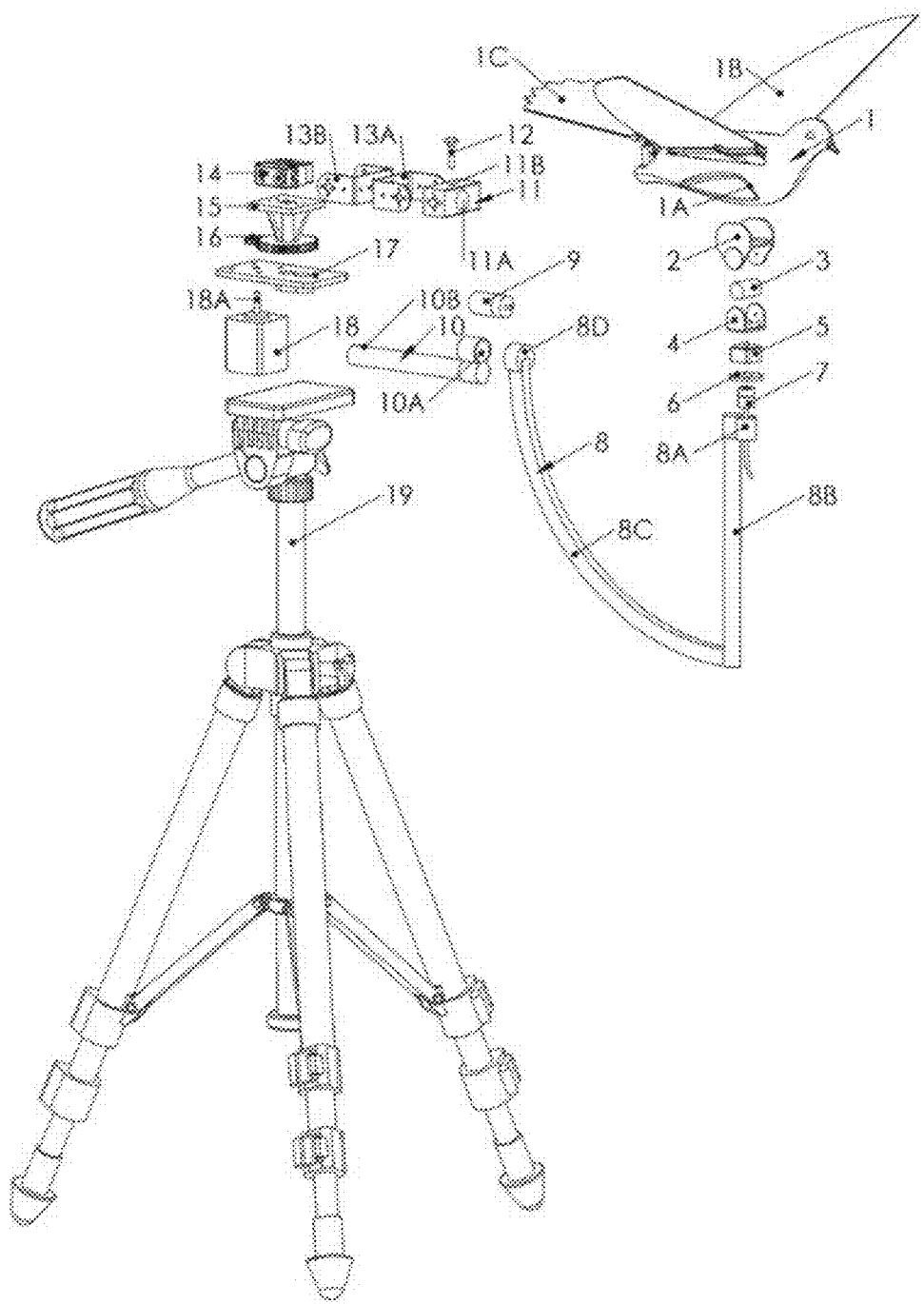
FIG. 3 is a schematic structural diagram of a measurement mechanism according to an embodiment of the present invention.

As shown in FIG. 3, the measurement mechanism of this embodiment includes an Euler angle controller, a flow angle controller, a multidimensional force sensor 7, and a tripod 19. The flow angle controller is mounted on the tripod 19. The Euler angle controller is in transmission connection with the flow angle controller. The flapping-wing aerial vehicle prototype 1 is detachably connected to the Euler angle controller by using a first connecting member 2. The Euler angle controller is configured to control Euler angles of the flapping-wing aerial vehicle prototype 1. The flow angle controller is configured to control a flow angle of the flapping-wing aerial vehicle prototype 1. The tripod 19 is fixed to the ground, so that a movement range of the flapping-wing aerial vehicle prototype 1 falls within an effective test range of a wind tunnel.

Further, the Euler angle controller includes a pitch control motor 3, a yaw control motor 5, and a roll control motor 9.

The pitch control motor 3 is fixed to a second connecting member 4. The first connecting member 2 is connected to an output shaft of the pitch control motor 3. The pitch control motor 3 controls, by using the output shaft thereof, the first connecting member 2 to rotate. A housing 1A of the flapping-wing aerial vehicle prototype 1 is mounted on the first connecting member 2. A center of mass of the flapping-wing aerial vehicle prototype 1 is located directly above the first connecting member 2. A pitch of the flapping-wing aerial vehicle prototype 1 can be controlled by controlling a rotation angle of the pitch control motor 3.

The yaw control motor 5 is fixed to a third connecting member 6. The second connecting member 4 is connected to an output shaft of the yaw control motor 5, and the output shaft is used to control the second connecting member 4 to rotate. A yaw of the flapping-wing aerial vehicle prototype 1 can be controlled by controlling a rotation angle of the yaw control motor 5.

The yaw control motor 5 is connected to an output shaft of the roll control motor 9 by using a first connecting rod 8. The output shaft of the roll control motor 9 controls, through a connection to a connection end 8D of the first connecting rod 8, the first connecting rod 8 to rotate. The roll control motor 9 is fixed in a second fixed sleeve 10A of a second connecting rod 10, and is connected to the flow angle controller by using the second connecting rod 10. A roll of the flapping-wing aerial vehicle prototype 1 can be controlled by controlling a rotation angle of the roll control motor 9.

The multidimensional force sensor 7 is fixed in a first fixed sleeve 8A of the first connecting rod 8. The yaw control motor 5 is fixed to the multidimensional force sensor 7 by using the third connecting member 6. Specifically, in this embodiment, the multidimensional force sensor 7 is an ATI six-dimensional force sensor.

Further, the first connecting rod 8 includes a straight rod portion 8B and a circular arc portion 8C. One end of the circular arc portion 8C is connected to the output shaft of the roll control motor 9, and an arc radius of the circular arc portion 8C is greater than a maximum distance from the center of mass of the flapping-wing aerial vehicle prototype 1 to an end of the tail 1C of the flapping-wing aerial vehicle prototype 1, so that the flapping-wing aerial vehicle prototype 1 is not hindered during rotation.

The flow angle controller includes an angle-of-attack control servo 14 and a sideslip angle control motor 18.

The angle-of-attack control servo 14 is fixed to a rotary turntable 15. An output gear of the angle-of-attack control servo 14 is connected to a first U-shaped servo arm 13B. The first U-shaped servo arm 13B is connected to a second U-shaped servo arm 13A. The second U-shaped servo arm 13A is connected to a fourth connecting member 11. The second connecting rod 10 is inserted into a first through hole 11A of the fourth connecting member 11. A second through hole JOB at the end of the second connecting rod 10 is fixed to the first through hole 11A by using a fixing bolt 12. An angle of attack of the flapping-wing aerial vehicle prototype 1 can be controlled by controlling a rotation angle of the angle-of-attack control servo 14.

The sideslip angle control motor 18 is fixed to a fifth connecting member 17. An output shaft of the sideslip angle control motor 18 is fixedly connected to a primary gear of a gear reduction unit 16. A secondary gear of the gear reduction unit 16 is fixedly connected to the rotary turntable 15. The rotary turntable 15, the gear reduction unit 16, and the fifth connecting member 17 are fixed to the tripod 19 by using a fixing shaft. A sideslip angle of the flapping-wing aerial vehicle prototype 1 can be controlled by controlling a rotation angle of the sideslip angle control motor 18.

Preferably, the first connecting rod 8 and the second connecting rod 10 of this embodiment are made of hollow aluminum alloy materials, having characteristics of light weight, high rigidity, low price, easy processing, and the like. The pitch control motor 3, the yaw control motor 5, the roll control motor 9, and the sideslip angle control motor 18 of this embodiment should preferably be step motors or servo motors, to ensure control accuracy.

The software platform of this embodiment is software running on the host computer platform. The host computer platform is in communication connection with the measurement mechanism and the wind tunnel, and is configured to control a wind speed of the wind tunnel and display a flight status of the flapping-wing aerial vehicle prototype 1 in real time during test. Preferably, in this embodiment, the measurement mechanism communicates with the host computer platform in a wireless communication manner, to avoid a measurement error and wire winding caused by line pulling on the measurement mechanism. The software platform includes five parts: a dynamic simulation module, a data decoding module, a wind speed adjustment module, a data processing module, and a display module.

The dynamic simulation module is configured to calculate flight data of the flapping-wing aerial vehicle prototype 1 of a next moment according to a mathematical model and a remote controller control signal that correspond to the flapping-wing aerial vehicle prototype 1, send the flight data to the data processing module, the display module, and the measurement mechanism, control three-dimensional movement of a virtual simulation object of the flapping-wing aerial vehicle prototype 1, and demonstrate the three-dimensional movement on the display module. The flight data includes attitude information, position information, and speed information.

The data decoding module is configured to receive triaxial aerodynamic force data and aerodynamic moment data of the flapping-wing aerial vehicle prototype 1 that are acquired by the multidimensional force sensor 7, or is configured to receive attitude information and position information of the flapping-wing aerial vehicle prototype 1, decode the received data, and send the decoded data to the display module.

The wind speed adjustment module is configured to send a wind speed of a wind tunnel obtained through calculation to the wind tunnel, so that the wind speed of the wind tunnel remains consistent with a flight speed in analog simulation.

The data processing module is configured to further calculate the flow angle of the flapping-wing aerial vehicle prototype 1 according to the attitude information and the position information that are obtained by the dynamic simulation module through calculation.

The display module is configured to display an attitude and a position during a simulated flight and dynamic data acquired by the multidimensional force sensor 7.

During a simulated flight test, a user performs a corresponding operation through a display interface shown in FIG. 1 to implement interaction between the user and a computer. A function navigation bar 101 is a function control, and performs an operation such as model loading, algorithm loading, attitude display, trail display, data saving, and control mode switching. A vertical navigation bar is divided into three major parts, and is mainly used as a display control. A data navigation bar 102 displays current Euler angles, a lift, a thrust, a flight path angle, and a flapping-wing frequency of a flapping-wing aerial vehicle model. A curve navigation bar 103 is configured to display a flight status and dynamic data, and a triaxial attitude curve or position curve of a simulation object of the flapping-wing aerial vehicle or a triaxial mechanical curve or a triaxial moment curve of the flapping-wing aerial vehicle prototype may be optionally displayed. An instrument navigation bar 104 displays flight speed and height changes. A track navigation bar 105 is used to observe a flight path of the flapping-wing aerial vehicle from a top-down perspective. A flapping-wing aerial vehicle 106 is a three-dimensional simulation model that is built according to a flapping-wing aerial vehicle entity, can achieve three-degree-of-freedom deflection, flying, changing the flapping-wing frequency, and other actions, and is a main observation body in an interface of the host computer. A following tail track 107 is a track generated during entire movement of the flapping-wing aerial vehicle, helping study a movement law of the flapping-wing aerial vehicle.

Figure 2:
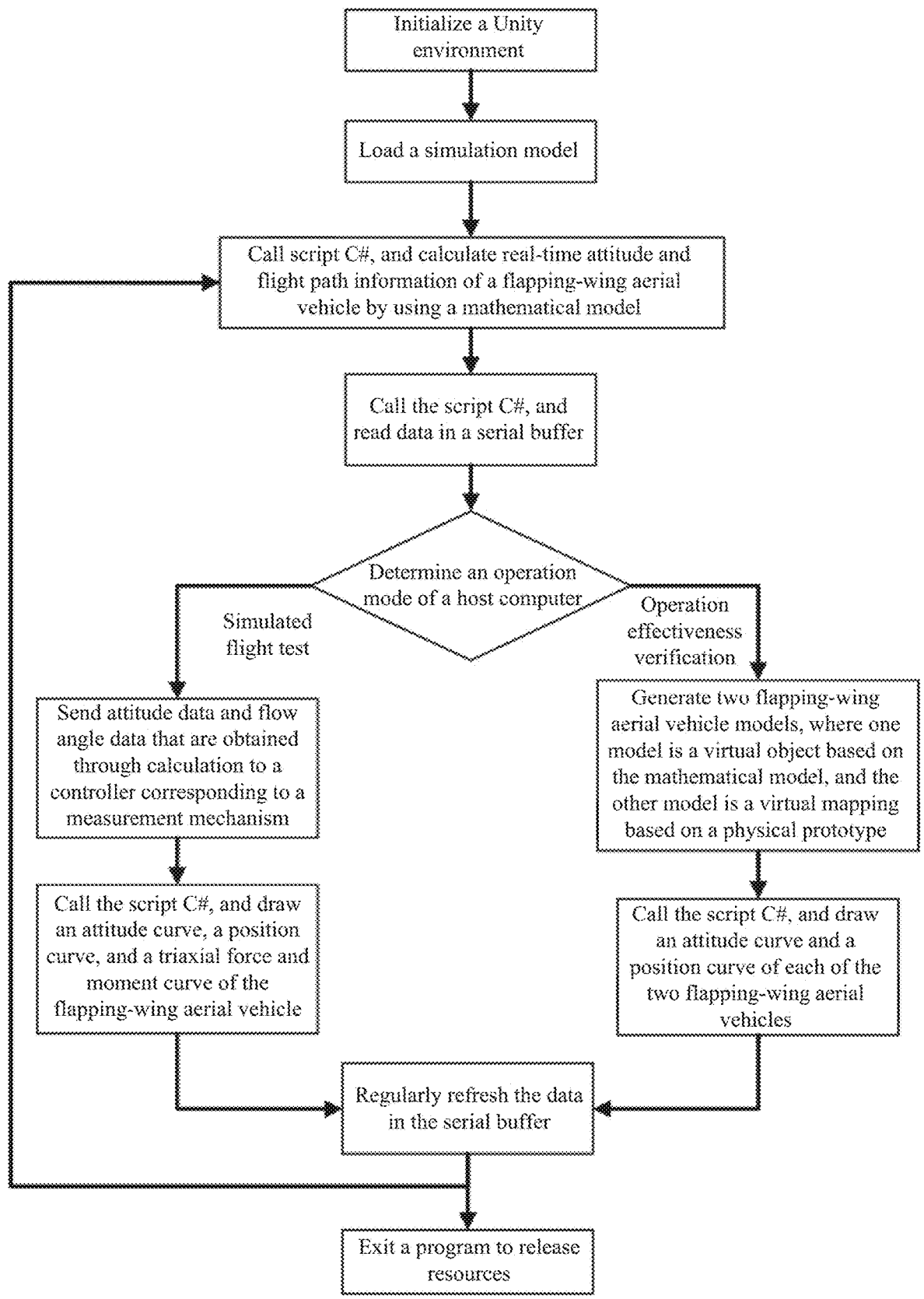
FIG. 2 is a flowchart of software operation of a host computer platform according to an embodiment of the present invention.

A procedure of running the host computer on the software platform is shown in FIG. 2, and includes the following specific steps.

(1) Set up a unity working environment, and complete an initialization process.

(2) Load a simulation model. The simulation model includes a physical simulation model of the flapping-wing aerial vehicle and a simulation environment scene model.

(3) Call script C#, and calculate real-time attitude and flight path information of the flapping-wing aerial vehicle by using a mathematical model.

(4) Call the script C#, and read data in a serial buffer. Specifically, if the software of the host computer works in a simulated flight test mode, a function Data Receive is used to read aerodynamic characteristics data (triaxial force and triaxial moment information) of the flapping-wing aerial vehicle prototype that is sent back by an ATI six-dimensional sensor in the buffer. If the host computer works in an operation effectiveness verification mode, the function Data Receive is used to read flight data (attitude and position information) of the flapping-wing aerial vehicle prototype in the buffer.

(5) If the host computer works in the simulated flight test mode, send attitude data and flow angle data that are obtained through calculation to the controllers on the measurement mechanism. Call the script C#, and complete measurement of dynamic characteristics of the flapping-wing aerial vehicle in a simulated flight state according to a drawn attitude curve, position curve, and triaxial force and moment curve of the flapping-wing aerial vehicle.

(6) If the host computer works in the operation effectiveness verification mode, generate two flapping-wing aerial vehicle models, where one model is a virtual object based on the mathematical model, and the other model is a virtual mapping based on a physical prototype. Call the script C#, draw an attitude curve and a position curve of each of the two flapping-wing aerial vehicles, and verify effectiveness of a given mathematical model through comparison and analysis.

(7) Regularly refresh the data in the serial buffer, and go back to step (3), for real-time data interaction.

(8) Exit a program to release resources.

It should be noted herein that, sequence numbers herein do not represent an execution order, and step (5) and step (6) should be performed at the same time.

Figure 4:
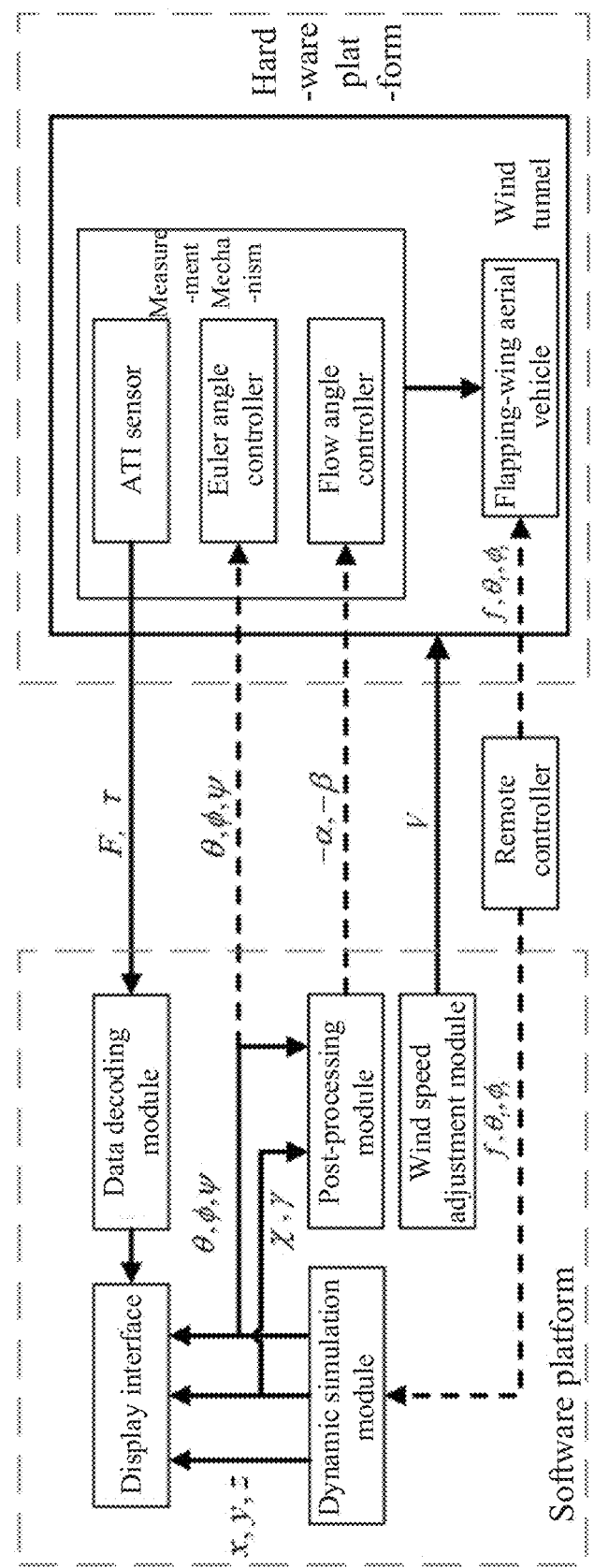
FIG. 4 is a schematic flowchart of a simulated flight test method for a flapping-wing aerial vehicle for a flight test system based on the present invention according to an embodiment of the present invention.

Based on the flight test system described above, this embodiment provides a simulated flight test method for a flapping-wing aerial vehicle. As shown in FIG. 4, the method includes the following specific steps.

(1) Start the software of the host computer and the wind tunnel, select a loading model control in the function navigation bar 101 in the display interface to load a three-dimensional model of the flapping-wing aerial vehicle, and load a mathematical model corresponding to the flapping-wing aerial vehicle onto the dynamic simulation module.

(2) Adjust the wind speed of the wind tunnel, the flow angle, and an initial attitude of the flapping-wing aerial vehicle prototype 1 to be consistent with those on the software platform.

(3) Use the remote controller to simultaneously send a control signal to a simulated flapping-wing aerial vehicle on the software platform and the flapping-wing aerial vehicle prototype 1. The flapping-wing aerial vehicle prototype 1 receives the control signal and performs a corresponding action, for example, adjusting a wing flapping frequency f or/and a tail flapping angle $\theta_t$ or/and a tail roll $\phi_t$.

(4) The dynamic simulation module calculates an attitude $(\theta, \phi, \psi)$, position information (x, y, z), and a speed V of the flapping-wing aerial vehicle of a next moment according to the control signal and a current flight status, displays the attitude, the position information, and the speed in real time in a three-dimensional manner in the display interface of the host computer.

(5) Send Euler angles obtained through calculation to the Euler angle controller of the measurement mechanism, control the pitch control motor of the measurement mechanism to rotate by $\theta$ degrees, control the yaw control motor to rotate by $\psi$ degrees, and control a roll control motor to rotate by $\phi$ degrees.

(6) Further calculate flow angles $\alpha$ and $\beta$ according to the Euler angles $\theta$ and $\psi$ and flight path angles $\gamma$ and $\chi$ of the flapping-wing aerial vehicle that are obtained through calculation, where $\alpha=\theta-\gamma$, $\beta=\psi-\chi$, $\alpha$ is the angle of attack, and $\beta$ is the sideslip angle. Send the flow angles to the flow angle controller, control the angle-of-attack control servo of the measurement mechanism to rotate by $-\alpha$ degrees, and control the sideslip angle control motor to rotate by $-\beta \times s$ degrees, where s is a reduction-gear ratio of the gear reduction unit.

(7) Send the speed V obtained through calculation to the wind tunnel by using the wind speed control module, to control the wind speed of the wind tunnel to remain consistent with a simulation speed.

(8) Measure triaxial aerodynamic force and aerodynamic moment data of the flapping-wing aerial vehicle in the simulated flight environment by using the ATI six-dimensional sensor in the measurement mechanism, and transfer the triaxial aerodynamic force and aerodynamic moment data to the data decoding module of the host computer in real time.

(9) The data decoding module decodes the acquired data, and then sends the decoded data to the display interface, to view attitude, track, and dynamic characteristic curve data by selecting different function controls in the function navigation bar 101 in the display interface.

Optionally, a loading algorithm control in the function navigation bar 101 in the display interface may be selected to measure a dynamic characteristic curve of the flapping-wing aerial vehicle prototype under automatic flight control. A switch control mode control in the function navigation bar 101 in the display interface may be selected to switch between an automatic control mode and a manual control mode.

Figure 5:
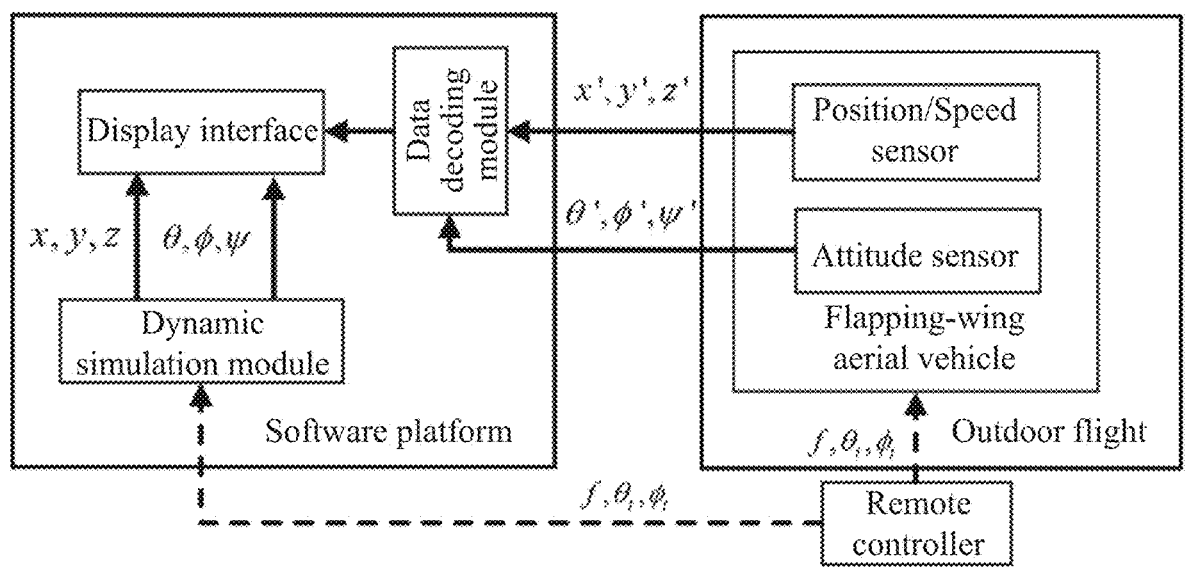
FIG. 5 is a schematic flowchart of an operation effectiveness verification method of a flapping-wing aerial vehicle model for a flight test system based on the present invention according to an embodiment of the present invention.

According to another aspect, based on the flight test system described above, this embodiment further provides an operation effectiveness verification method of a flapping-wing aerial vehicle model. The method for verifying operation effectiveness is to perform quantitative analysis on model effectiveness by comparing output data of a simulated system and output data of an actual system under a same initial condition and with a same input. With reference to FIG. 5, the method includes the following specific steps.

(1) Start simulation, and load a simulation environment.

(2) Fly the flapping-wing aerial vehicle prototype in a windless environment, start a wireless communication receiving module of the host computer, and acquire in real time flight data sent back by the flapping-wing aerial vehicle, where the flight data includes attitude data, a position/speed, and the like.

(3) Generate two flapping-wing aerial vehicle models in the display interface of the host computer, where one model serves as a simulation object to load a customized mathematical model, and the other model serves as a virtual mapping of a real flapping-wing aerial vehicle to receive the flight data.

(4) Initialize control motion states of the two flapping-wing aerial vehicles with the currently received flight data of the flapping-wing aerial vehicle prototype.

(5) The remote controller sends a control signal (f, $\theta_t$, $\phi_t$), and controls the physical flapping-wing aerial vehicle prototype and the virtual simulation object at the same time, where the virtual simulation object performs a corresponding action according to the control signal, and calculate attitude information $(\theta, \phi, \psi)$ and position information (x, y, z) of a next moment based on the mathematical model according to the dynamic simulation module; and the flapping-wing aerial vehicle prototype performs a corresponding action according to the remote control signal, and sends back real-time attitude information $(\theta', \phi', \gamma')$ and position information (x', y', z').

(6) Assign values of the attitude and position information obtained by the dynamic simulation module through calculation to the simulation object of the flapping-wing aerial vehicle, and assign values of the received flight data of the flapping-wing aerial vehicle prototype to the virtual mapping of the flapping-wing aerial vehicle.

(7) Update an animation of the display interface, display the flight data at corresponding positions of the data navigation bar 102, the curve navigation bar 103, the instrument navigation bar 104, and the track navigation bar 105, and draw flight tail tracks 107 respectively.

(8) Set an error threshold, compare a track error of each of the attitude and the position with the error threshold. If an actual error is less than the error threshold, the model is considered valid.

Preferably, position/speed information may be provided by a GPS/INS sensor, and attitude information may be provided by a JY901 sensor.

In conclusion, this embodiment provides a simulated flight test environment for the flapping-wing aerial vehicle to obtain dynamic characteristic data of the flapping-wing aerial vehicle in flight, which can replace a flight test to some extent, improve test efficiency, and reduce a prototype damage rate. The host computer platform provides an intuitive three-dimensional presentation for an attitude reconstruction process of the flapping-wing aerial vehicle. A user can verify a mathematical mode with reference to a flapping-wing aerial vehicle prototype, a wind tunnel, and a measurement mechanism. In addition to the mathematical model of the flapping-wing aerial vehicle described above, the user can also import a self-built mathematical model into the host computer platform for verification and testing. In addition, the user can further load a designed flight control algorithm onto a simulation model, to verify effectiveness of the algorithm.

In addition, it should be noted that, a person skilled in the art should understand that the embodiments of the present invention may be provided as a method, an apparatus, or a computer program product. Therefore, the embodiments of the present invention may be in a form of hardware only embodiments, software only embodiments, or embodiments with a combination of software and hardware. Moreover, the embodiments of the present invention may be in a form of a computer program product that is implemented on one or more computer-usable storage media that include computer-usable program code.

The embodiments of the present invention are described with reference to the flowcharts and/or block diagrams of the method, the terminal device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, an embedded processor, or a processor of another programmable data processing terminal device to generate a machine, so that the instructions executed by a computer or a processor of another programmable data processing terminal device generate an apparatus for implementing a specific function in one or more processes in the flowcharts and/or in one or more blocks in the block diagrams.

These computer program instructions may also be stored in a computer readable memory that can instruct the computer or another programmable data processing terminal device to work in a specific manner, so that the instructions stored in the computer readable memory generate an artifact that includes an instruction apparatus. The instruction apparatus implements a specific function in one or more processes in the flowcharts and/or in one or more blocks in the block diagrams. These computer program instructions may also be loaded onto a computer or another programmable data processing terminal device, so that a series of operations and steps are performed on the computer or the other programmable terminal device, thereby generating computer-implemented processing. Therefore, the instructions executed on the computer or the other programmable terminal device provide steps for implementing a specific function in one or more processes in the flowcharts and/or in one or more blocks in the block diagrams.

It should be noted that terms "including", "comprising" or any other variants thereof are intended to cover non-exclusive inclusion, so that a process, method, article, or terminal device including a series of elements includes not only those elements but also other elements not explicitly listed, or elements inherent to such a process, method, article, or terminal device. Without more restrictions, the elements defined by the sentence "including a . . . " do not exclude the existence of other identical elements in the process, method, article, or terminal device including the elements.

Finally, it should be noted that the foregoing descriptions are preferred implementations of the present invention. It should be noted that although the preferred embodiments of the present invention have been described, a person of ordinary skill in the art, once knowing the basic inventive concept of the present invention, can further make several improvements and modifications without departing from the principle of the present invention, and these improvements and modifications should also be considered as falling within the protection scope of the present invention. Therefore, the appended claims are intended to be construed as covering the preferred embodiments and all changes and modifications falling within the scope of the embodiments of the present invention.

What is claimed is:

1. A flight test system for a flapping-wing aerial vehicle, wherein the flight test system comprises a host computer platform, a measurement mechanism, and a wind tunnel, wherein the measurement mechanism is configured to mount a flapping-wing aerial vehicle prototype, both the flapping-wing aerial vehicle prototype and the measurement mechanism are placed in the wind tunnel;

the measurement mechanism comprises an Euler angle controller, a flow angle controller, and a tripod, wherein the flow angle controller is mounted on the tripod, the Euler angle controller is in transmission connection with the flow angle controller, the flapping-wing aerial vehicle prototype is detachably connected to the Euler angle controller by using a first connecting member, the Euler angle controller is configured to control Euler angles of the flapping-wing aerial vehicle prototype during a test, and the flow angle controller is configured to control a flow angle of the flapping-wing aerial vehicle prototype during the test;

the host computer platform is in communication connection with the measurement mechanism and the wind tunnel, and is configured to control a wind speed of the wind tunnel and display a flight status of the flapping-wing aerial vehicle prototype in real time during the test;

the Euler angle controller comprises a pitch control motor, a yaw control motor, and a roll control motor;

the pitch control motor is fixed to a second connecting member, the first connecting member is connected to an output shaft of the pitch control motor, a housing of the flapping-wing aerial vehicle prototype is mounted on the first connecting member, a center of mass of the flapping-wing aerial vehicle prototype is located directly above the first connecting member, and a pitch of the flapping-wing aerial vehicle prototype is controlled by controlling a rotation angle of the pitch control motor;

the yaw control motor is fixed to a third connecting member, the second connecting member is connected to an output shaft of the yaw control motor, and a yaw of the flapping-wing aerial vehicle prototype is controlled by controlling a rotation angle of the yaw control motor; and the yaw control motor is connected to an output shaft of the roll control motor by using a first connecting rod, the roll control motor is connected to the flow angle controller by using a second connecting rod, and a roll of the flapping-wing aerial vehicle prototype is controlled by controlling a rotation angle of the roll control motor.

2. The flight test system according to claim 1, wherein the measurement mechanism further comprises a multidimensional force sensor, the multidimensional force sensor is fixedly connected to the first connecting rod, and the yaw control motor is fixed to the multidimensional force sensor by using the third connecting member.

3. The flight test system according to claim 2, wherein the first connecting rod comprises a straight rod portion and a circular arc portion, wherein an end of the straight rod portion is provided with a fixed sleeve, the multidimensional force sensor is fixed within the fixed sleeve, an end of the circular arc portion is connected to the output shaft of the roll control motor, and an arc radius of the circular arc portion is greater than a maximum distance from the center of mass of the flapping-wing aerial vehicle prototype to an end of a tail of the flapping-wing aerial vehicle prototype.

4. The flight test system according to claim 1, wherein the flow angle controller comprises an angle-of-attack control servo and a sideslip angle control motor;

the angle-of-attack control servo is fixed to a rotary turntable, an output gear of the angle-of-attack control servo is connected to a first U-shaped servo arm, the first U-shaped servo arm is connected to a second U-shaped servo arm, the second U-shaped servo arm is connected to a fourth connecting member, the second connecting rod is inserted into the fourth connecting member, and an angle of attack of the flapping-wing aerial vehicle prototype is controlled by controlling a rotation angle of the angle-of-attack control servo; and the sideslip angle control motor is fixed to a fifth connecting member, an output shaft of the sideslip angle control motor is fixedly connected to a primary gear of a gear reduction unit, a secondary gear of the gear reduction unit is fixedly connected to the rotary turntable, the rotary turntable, the gear reduction unit, and the fifth connecting member are fixed to the tripod by using a fixing shaft, and a sideslip angle of the flapping-wing aerial vehicle prototype is controlled by controlling a rotation angle of the sideslip angle control motor.

5. The flight test system according to claim 4, wherein an end of the second connecting rod inserted into the fourth connecting member is provided with a through hole, and the second connecting rod is fixed to the fourth connecting member by using a fixing bolt through the through hole.

6. The flight test system according to claim 2, wherein the host computer platform comprises a dynamic simulation module, a data decoding module, a wind speed adjustment module, a data processing module, and a display module, wherein the dynamic simulation module is configured to calculate flight data of the flapping-wing aerial vehicle prototype of a next moment according to a mathematical model and a remote controller control signal, wherein the mathematical model and the remote controller control signal correspond to the flapping-wing aerial vehicle prototype, the dynamic simulation module is configured to send the flight data to the data processing module, the display module, and the measurement mechanism, control three-dimensional movement of a virtual simulation object of the flapping-wing aerial vehicle prototype, and demonstrate the three-dimensional movement on the display module, wherein the flight data comprises attitude information, position information, and speed information;

the data decoding module is configured to receive triaxial aerodynamic force data and aerodynamic moment data of the flapping-wing aerial vehicle prototype, wherein the triaxial aerodynamic force data and the aerodynamic moment data are acquired by the multidimensional force sensor, or the data decoding module is configured to receive the attitude information and the position information of the flapping-wing aerial vehicle prototype, decode the attitude information and the position information to obtain decoded data, and send the decoded data to the display module;

the wind speed adjustment module is configured to send the speed information of the virtual simulation object of the flapping-wing aerial vehicle prototype to the wind tunnel, wherein the wind speed of the tunnel remains consistent with a flight speed in analog simulation;

the data processing module is configured to further calculate the flow angle of the flapping-wing aerial vehicle prototype according to the attitude information and the position information, wherein the attitude information and the position information are obtained by the dynamic simulation module through calculation; and the display module is configured to display an attitude and a position during a simulated flight and dynamic data acquired by the multidimensional force sensor.

7. The flight test system according to claim 1, wherein the first connecting rod and the second connecting rod are made of hollow aluminum alloy materials.

8. The flight test system according to claim 4, wherein the pitch control motor, the yaw control motor, the roll control motor, and the sideslip angle control motor are step motors or servo motors.

9. The flight test system according to claim 1, wherein the measurement mechanism communicates with the host computer platform in a wireless communication manner.

* * * * *